Figure 1:
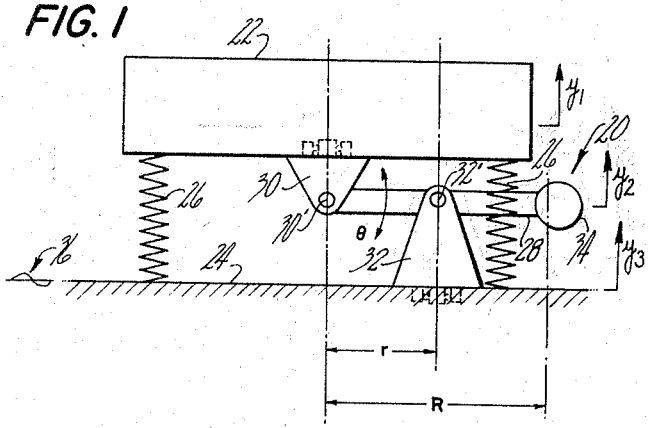

May 30, 1967 W. G. FLANNELLY 3,322,379
DYNAMIC ANTIRESONANT VIBRATION ISOLATOR
Filed Nov. 3, 1964

INVENTOR.
WILLIAM G. FLANNELLY

BY McCormick, Paulding & Huber

United States Patent Office 3,322,379
Patented May 30, 1967

3,322,379
DYNAMIC ANTIRESONANT VIBRATION
ISOLATOR
William G. Flannelly, South Windsor, Conn., assignor to
Kaman Aircraft Corporation, Bloomfield, Conn., a corporation of Connecticut
Filed Nov. 3, 1964, Ser. No. 408,543
2 Claims. (Cl. 248—20)

This invention relates to vibration isolators, and deals more particularly with a passive vibration isolator comprising essentially a moving mass and spring system interposed between the isolated body and the base or supporting structure.

The general object of this invention is to provide a simple vibration isolator which at certain predetermined exciting frequencies gives greater isolation with considerably lower static deflections than conventional isolators. In keeping with this object, a more particular object is to provide a vibration isolator especially suitable for isolating low frequency excitations and capable of effectively reducing the transmission of excitations in a low frequency range not satisfactorily handled by present isolators.

A further object of this invention is to provide a vibration isolator of the foregoing character which at a tuned antiresonant exciting frequency theoretically gives one hundred percent isolation and in actuality gives an isolation very closely approaching one hundred percent isolation. In keeping with this object, another object is to provide a vibration isolator having such an antiresonant frequency which is independent of the mass of the isolated body.

Another object of this invention is to provide a vibration isolator which can provide a substantial degree of isolation over a greater range of excitation frequencies than any existing isolator of similar simplicity and which also has a lower shock transmissibility than conventional isolators.

Another object of this invention is to provide a vibration isolator which is capable of isolating a relatively heavy body with comparatively little mass in itself, thereby making the isolator particularly useful in aircraft, spacecraft and other applications where weight reduction is important.

A still further object of this invention is to provide a vibrator isolator which may be combined with damping to reduce the amplification of the excitation vibration in the vicinity of the resonant frequency without seriously impairing the isolation properties at frequencies above resonance.

Other objects and advantages of the invention will be apparent from the following description and from the drawings forming a part hereof.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Figure 2:
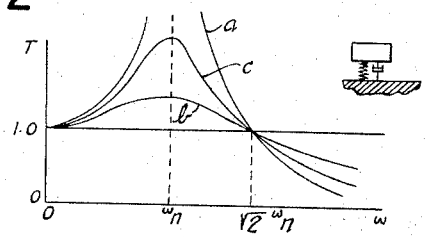
Figure 3:
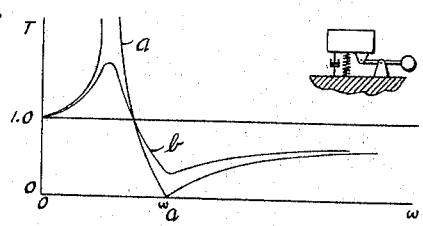
Figure 4:
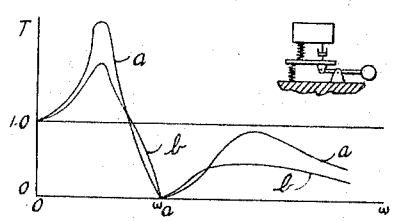

Of the drawings:
FIG. 1 is a schematic side view of a vibration isolator embodying the present invention.
FIG. 2 is a graph showing the frequency response of a conventional spring-damper isolator.
FIG. 3 is a graph showing the frequency response of an isolator embodying the present invention.
FIG. 4 is a graph showing the frequency response of an isolator of the present invention connected in series with a spring-damper system.

The vibration isolator of the present invention is intended to be interposed between two bodies having at least one degree of freedom of movement relative to each other, the purpose of the isolator being to prevent or reduce the transmission of the movement of one body to the other body. Assuming a reference coordinate system for the two bodies, it is generally desired to maintain one body generally stationary relative to the reference system while permitting the other body to move or vibrate relative thereto. In the discussion and claims which follow, the body which it is desired to maintain stationary is referred to as the "isolated body" or merely "body" and the body which is permitted to move or vibrate is referred to as the "base." It will be understood, however, that these terms are dependent on the choice of reference systems in that either of the two relatively moving bodies may be considered the "isolated body" or the "base" depending on the reference system chosen.

In accordance with the present invention, the vibration isolator basically comprises a resilient connection between the isolated body and the base which provides a resistance to movement of the body relative to the base away from a static or neutral position in the particular degree of freedom of movement involved. In addition to the resilient connecting means, the isolator also includes an auxiliary mass which is moved relative to the base in response to the relative movement between the base and the body, in the particular degree of freedom involved. As a result of the resilient connection and the moving auxiliary mass, the interaction of kinetic and potential energies is such that for most frequencies of vibration reduced forces and movements are transmitted from the base to the body, and for one frequency theoretically no forces or movements are transmitted.

Turning now to the drawings and first considering FIG. 1, this figure shows a vibration isolator embodying this invention, the isolator being indicated generally at 20 and being associated with an isolated body 22 and a base or supporting structure 24. The isolator 20 includes a number of helical compression springs 26, 26 which extend from the base 24 to the body 22 and which under static conditions support substantially the full weight or vertical load of the body 22. In the FIG. 1 construction, one spring 26 is placed at each of the four corners of the body 22; however, the number and arrangement of the springs are not important to the invention and if desired, a single spring or any other number of springs may be utilized. The springs, it will be obvious from FIG. 1, provide a resilient resistance to movement of the body 22 relative to the base 24 along a vertical axis and in either direction from the static position illustrated.

In addition to the springs 26, 26, the isolator 20 of FIG. 1 also includes a horizontal lever 28 which is pivotally connected to the body 22 at a pivot point by a pivot pin 30' disposed in lug means 30 and which is pivotally connected to the base 24 at a pivot point by a pivot pin 32' disposed in post means 32, the two pivot pins 30', 32' being spaced horizontally from each other by a distance $r$. The lever 28, as shown, carries a weight 34, and the combined center of gravity of the weight 34 and the lever 28 is located a distance $R$ from the pivot point 30'. The combined mass of the lever 28 and weight 34 constitutes the auxiliary mass previously referred to. The weight 34 need not be separate from the lever 28 and, if desired, the lever alone may by itself constitute the auxiliary mass. The center of gravity of the lever, or of the lever and weight if a weight is used, may be designed to fall at various different points along the length of the lever with various different locations producing slightly different results as hereinafter described. In the claims, the term "weighted lever" is used to refer to a lever used either with or without an auxiliary mass, and where the lever is used with an auxiliary mass the term includes both the lever and the auxiliary mass.

Still referring to FIG. 1, and now considering an analysis of the operation of the isolator there shown, let the angle $\theta$ represent the angular displacement of the lever 28 relative to the body 22 about the pivot point 30′, K the combined spring rate of the springs 26, 26. $m_1$ the mass of the body 22, $m_2$ the mass of the auxiliary mass and lever, and I the moment of inertia of the auxiliary mass and lever about their combined center of gravity. Also, $y_3$ indicates the vertical displacement of the base 24, $y_2$ the vertical displacement of the center of gravity of the lever 28 and $y_1$ the vertical displacement of the body 22. Assuming that the base 24 is now excited by a sinusoidal vibration, as indicated at 36, the kinetic energy of the system may be expressed as:

Kinetic energy $= T = \frac{1}{2} m_1 \dot{y}_1^2 + \frac{1}{2} m_2 \dot{y}_2^2 + \frac{1}{2} I \dot{\theta}^2$ But $$\theta = \frac{y_1 - y_3}{r} \text{ and } y_2 = y_1\left(1 - \frac{R}{r}\right) + \frac{R}{r} y_3$$

Substituting these expressions for $\theta$ and $y_2$ in the kinetic energy equation gives:

$$T = \frac{1}{2} m_1 \dot{y}_1^2 + \frac{1}{2} m_2 \left[ \dot{y}_1^2 \left(1 - \frac{R}{r}\right)^2 + 2 \dot{y}_1 \dot{y}_3 \frac{R}{r}\left(1 - \frac{R}{r}\right) + \frac{R^2}{r^2} \dot{y}_3^2 \right] + \frac{1}{2} \frac{I}{r^2}[\dot{y}_1^2 - 2\dot{y}_1\dot{y}_3 + \dot{y}_3^2]$$

The potential energy of the system may be expressed as:

Potential energy $= V = \frac{1}{2} K (y_1 - y_3)^2$

Using La Grange's equation:

$$\frac{d}{dt} \frac{\partial T}{\partial \dot{q}_k} - \frac{\partial T}{\partial q_k} + \frac{\partial V}{\partial q_k} = Q_k$$

The equation of motion is obtained:

$$m_1 \ddot{y}_1 + m_2 \left[ \ddot{y}_1 \left(1 - \frac{R}{r}\right)^2 + \frac{R}{r}\left(1 - \frac{R}{r}\right) \ddot{y}_3 \right] + \frac{I}{r^2}(\ddot{y}_1 - \ddot{y}_3) + K y_1 - K y_3 = 0$$

Rearranging and substituting $-\ddot{y}_1 = y_1 \omega^2$ and $-\ddot{y}_3 = y_3 \omega^2$ gives the transmissibility:

$$T_d = \frac{y_1}{y_3} = \frac{K - \omega^2 \left[\frac{I}{r^2} - m_2 \frac{R}{r}\left(1 - \frac{R}{r}\right)\right]}{K - \omega^2 \left[m_1 + \left(1 - \frac{R}{r}\right)^2 m_2 + \frac{I}{r^2}\right]}$$

If the coefficient of $\omega^2$ in the numerator is positive, $T_d = 0$ when:

$$\omega^2 = \omega_a^2 = \frac{K}{\frac{I}{r^2} - m_2 \frac{R}{r}\left(1 - \frac{R}{r}\right)}$$

From the above equation, it should be noted that the antiresonant frequency $\omega_a$ is independent of $m_1$, the isolated mass.

The system is in resonance, $T_d = \infty$, at $$\omega^2 = \omega_R^2 = \frac{K}{m_1 + \left(1 - \frac{R}{r}\right)^2 m_2 + \frac{I}{r^2}}$$

At very high frequencies, the spring terms in the transmissibility equation become negligible, and therefore the transmissibility equation may be rewritten as:

$$T_{d_{VHF}} = \frac{I/r^2 - m_2 \frac{R}{r}\left(1 - \frac{R}{r}\right)}{m_1 + \left(1 - \frac{R}{r}\right)^2 m_2 + I/r^2} = \frac{\omega_R^2}{\omega_a^2}$$

The frequency response characteristic of the isolator 20 of FIG. 1 is shown in FIG. 3 and is discussed in more detail hereinafter.

Turning to FIGS. 2, 3 and 4, these figures illustrate in graphic form, the characteristics of conventional spring-damper isolators, an isolator of the present invention, an isolator of the present invention as combined in series with spring-damper systems. For comparison purposes, the three graphs are drawn to the same scale and represent isolators having in each case the same static deflection. Turning first to FIG. 2, this figure shows the general frequency response characteristics of a conventional spring-damper system as shown by the schematic diagram in the right-hand portion of the figure. In this and in the following two figures, the horizontal axis represents the frequency of the exciting vibration and the vertical axis represents the transmissibility of the isolator in question. In FIG. 2, the three different curves represent the response for three different degrees of damping, the curve $a$ showing the response for a zero damping ratio, the curve $b$ showing the response for a relatively high damping ratio, and the curve $c$ showing the response for an intermediate damping ratio. All three curves have the same resonant frequency, $\omega_n$, and have a transmissibility greater than 1.0 up to a frequency of $\sqrt{2}\omega_n$. At a frequency of $\sqrt{2}\omega_n$, the transmissibility is 1.0 and thereafter the transmissibility gradually diminishes as the frequency increases. Only at relatively high frequencies is a substantial reduction in transmissibility obtained, and at no frequency is the transmissibility reduced to zero.

FIG. 3 shows the response characteristics of an isolator embodying the present invention and shown in the schematic illustration to the right of the figure. In this figure, the curve $a$ represents the frequency response characteristic for zero parallel damping and the curve $b$ represents the response for a system including some parallel damping. Considering first the curve $a$, it will be noted that this curve passes through a resonance at which the transmissibility approaches infinity and which occurs at a frequency substantially below the natural frequency of the conventional system represented in FIG. 2. After passing through the resonant frequency, the transmissibility drops rapidly toward zero and becomes zero at an antiresonant frequency $\omega_a$. After passing the antiresonant frequency, the transmissibility slowly increases as the frequency increases, but for all frequencies above the antiresonant frequency the transmissibility remains substantially less than one. More particularly, as the exciting frequency increases the transmissibility asymptotically approaches a fixed value less than one, the fixed value being dependent on the mass $m_2$ of the auxiliary mass, the moment of inertia I of the auxiliary mass, and the distance $r$ between the two pivot points 30 and 32. By properly selecting these parameters this fixed value may be set at any predetermined low value. Also, by properly selecting these parameters and the distance R from the pivot point 30 to the moment of inertia I the antiresonant frequency $\omega_a$ may be made to fall at different points relative to the resonant frequency, and more particularly may be made to fall either below or above the resonant frequency.

Considering the curve $b$ in FIG. 3, it will be noted that by adding parallel damping to the isolator, the amplification of the transmissibility at the resonant frequency is considerably reduced. After passing the resonant frequency, the transmissibility again sharply falls off toward zero, but because of the damping the zero transmissibility point is not quite reached. Nevertheless, after failing below unity transmissibility, the curve $b$ fairly closely approximates the curve $a$ so that at frequencies substantially above resonance the parallel damped system performs substantially the same as the undamped system except for failing to pass through a truly resonant point which the transmissibility is zero.

FIG. 4 shows in graphical form the response of an isolator of the present invention as combined in series with a spring-damper system, the complete system being shown by the schematic representation at the right of the figure.

In this figure, the curve *a* indicates the response of a system with one damping ratio and the curve *b* indicates the response of a system with a larger damping ratio. From comparing these two curves, and the curve *a* of FIG. 3, it will be noted that by adding series damping the transmissibility at the resonant frequency is considerably reduced and that the transmissibility curve still goes through a true antiresonance point at which the transmissibility is zero. Immediately following the antiresonant frequency, the transmissibility tends to peak at a higher value that it would without series damping, but by using a proper value of damping this peak may be kept fairly low, if necessary, and at higher frequencies the transmissibility approaches zero. Therefore, this isolator system esssentially combines the desirable characteristics of both the conventional spring-damper isolator and the basic isolator of this invention as shown in FIG. 1.

Another important point to observe from FIGS. 2, 3 and 4 is that the isolator of the present invention produces effective reduction in transmissibility at much lower frequencies than a conventional isolator. For example, for the isolators represented by the graphs, it will be noted that the antiresonant frequencies of the isolators made in accordance with the invention occur close to the resonant frequency of the equal static deflection conventional isolator. Also, over a considerable band of frequencies extending to either side of the antiresonant frequency, the transmissibility of the isolators of FIGS. 3 and 4 is less than that of the conventional isolator of FIG. 2. Although not shown by the graphs, it has also been found, and may be shown by mathematical analysis, that an isolator made in accordance with the invention has a much greater capability of reducing the transmission of shocks than does a conventional spring-damper isolator of equivalent stiffness.

I claim:

1. The combination with a body and a base of a vibration isolator for reducing the transmission of vibrations between said body and said base at one frequency of vibration occurring generally parallel to a given reference axis, said isolator comprising spring means interposed between said body and base providing a resilient resistance to movement of said body relative to said base in either direction parallel to said given axis from a given static position, a weighted lever, means connecting said weighted lever to said body for pivotal movement relative thereto about a first pivot axis common to said body and said weighted lever and located in a plane generally perpendicular to said given axis, and means connecting said weighted lever to said base for pivotal movement relative thereto about a second pivot axis common to said base and said weighted lever and located in a plane generally perpendicular to said given axis, said first and second pivot axes being parallel to one another and spaced from one another along a second reference axis generally perpendicular to said given axis, and said spring means, weighted lever and connecting means being further so constructed and arranged that $$m_1 r \neq m_2(R-r)$$

and that at one frequency of vibration $$\frac{K}{\frac{I}{r^2} - m_2 \frac{R}{r}\left(1 - \frac{R}{r}\right)} = \omega^2$$

where
$\omega$ = said one frequency of vibration,
$K$ = the spring constant of said spring means,
$m_1$ = the mass of said body,
$m_2$ = the mass of said weighted lever,
$R$ = the spacing along said second reference axis from said first pivot axis to the center of gravity of said weighted lever,
$r$ = the spacing along said second reference axis between said first and second pivot axes, and
$I$ = the moment of inertia of said weighted lever about its center of gravity in a plane perpendicular to said pivot axes.

2. The combination defined in claim 1 further characterized by said second pivot axis being located between said first pivot axis and the center of gravity of said weighted lever along said second reference axis.

References Cited

UNITED STATES PATENTS

| 626,873 | 6/1899 | Senderling. | |
|---|---|---|---|
| 989,958 | 4/1911 | Frahm | 248—20 X |
| 1,097,353 | 5/1914 | Olson. | |
| 1,723,430 | 8/1929 | Lee | 248—8 X |
| 1,973,510 | 9/1934 | Schieferstein | 248—358 |
| 2,148,937 | 2/1939 | Gerb | 248—20 X |
| 2,365,842 | 12/1944 | Rosenzweig | 248—20 |
| 2,637,514 | 5/1953 | O'Conner | 248—21 |
| 3,039,758 | 6/1962 | Gratzmuller. | |
| 3,088,062 | 4/1963 | Hudimac | 248—358 X |
| 3,145,012 | 8/1964 | Kfoury | 248—358 |
| 3,189,303 | 4/1965 | Boothe | 248—22 |
| 3,202,388 | 8/1965 | Goodwin | 248—8 |
| 3,202,412 | 8/1965 | Trask | 248—358 X |

CLAUDE A. LE ROY, *Primary Examiner.*

JOHN PETO, *Examiner.*